United States Patent
Dudler

[15] 3,662,394
[45] May 9, 1972

[54] RECORDING SPHYGMOMANOMETER

[72] Inventor: Hans A. Dudler, 36 School Street, Woburn, Mass. 01801

[22] Filed: Apr. 13, 1970

[21] Appl. No.: 27,490

[52] U.S. Cl.............................346/21, 128/2.05 SP, 346/78, 346/143
[51] Int. Cl........................................G01d 9/40, A61b 5/02
[58] Field of Search..............346/17, 104, 80, 78, 111, 143, 346/21; 128/2.05 G, 2.05 P, 2.05 R; 73/386, 387, 391

[56] References Cited

UNITED STATES PATENTS

| | | | |
|---|---|---|---|
| 1,078,138 | 11/1913 | Frick | 346/21 X |
| 1,264,277 | 4/1918 | Cook | 346/18 |
| 1,700,399 | 1/1929 | Bruhn | 346/21 X |
| 1,954,955 | 4/1934 | Siebers | 346/10 X |
| 2,184,973 | 12/1939 | Finch | 346/139 C |

Primary Examiner—Joseph W. Hartary
Attorney—Roberts, Cushman & Grover

[57] ABSTRACT

A sphygmomanometer of the aneroid gauge type having bellows connected through gears to rotate a shaft, and a pointer mounted on the shaft and movable over a dial to indicate pressure, includes recording means manually actuable to temporarily mark the systolic and diastolic pressures. The recording means has a two layer adhesion marking means attached to the dial and a stylus carried by the shaft in registry with the pointer, and movable to impress a mark upon the adhesion marking means. A separator is provided to detach the two layers to erase the earlier marks when the sphygmomanometer is again used.

5 Claims, 8 Drawing Figures

PATENTED MAY 9 1972 3,662,394

Inventor
Hans A. Dudler
by Roberts, Cushman & Grover
Attys

RECORDING SPHYGMOMANOMETER

BACKGROUND OF THE INVENTION

The field of this invention relates to aneroid pressure gauges such as are used in sphygmomanometry for clinical blood-pressure determinations, and to means for temporarily recording selected readings thereof.

The measurement of bloodpressure is undertaken through the use of a number of components collectively referred to as a sphygmomanometer. It consists of (1) an inflatable compression bag, enclosed within an inextensible cuff, for application of pressure to the artery; (2) an instrument to measure and indicate the applied pressure; (3) an inflation bulb to create pressure in the system; and (4) an adjustable valve through which deflation of the system can be controlled at any desired rate. In addition, a stethoscope is used to assist hearing of the Korotkov sounds whose onset and termination signal the systolic and diastolic pressures to be determined.

A bloodpressure determination is made as follows: The inflation bulb is used to increase pressure in the cuff until arterial flow is completely stopped. The valve is then cracked to cause the cuff to gradually deflate. As blood just begins to flow again (as spurts at the peak pressure of the arterial pressure cycle), the onset of Korotkov sounds is heard in the stethoscope. The pressure at which this event occurs is the systolic pressure, and its magnitude is to be noted. As cuff pressure further reduces, the blood flow is impeded by the cuff during less and less of the heart cycle, and finally the flow becomes continuous and the Korotkov sounds disappear. This pressure is the diastolic pressure, also to be noted.

To obtain the foregoing readings with existing equipment, it is necessary to focus attention simultaneously on both the threshold or disappearance of sound in the stethoscope, and on the moving display of declining pressure as furnished by the moving meniscus in a mercury-gravity manometer or as furnished by the moving pointer of an aneroid manometer. Once observed, it is further necessary to remember the pressures at which the Korotkov sounds appeared and disappeared until the measurement is over and they can be written down. These observational and memory obstacles to accurate measurement are bothersome, sometimes require repeated measurements, and cannot but contribute to operate mistake, especially with inexperienced operators.

SUMMARY OF THE INVENTION

Objects of the present invention are to provide a sphygmomanometer which eliminates the need to watch the changing manometer; which temporarily records desired pressure readings; which is simply and inexpensively constructed; and which is durable and reliable in use.

According to the invention the sphygmomanometer is of the type having a shaft carrying a pointer across a dial and comprises marking means adjacent the dial, a stylus carried by the shaft in registry with the pointer and movable to impress a mark upon said marking means, and erasure means for later removing said mark. Preferably the dial is transparent, the marking means has an adherable two-layer construction underneath the dial, and said stylus is caused to move by a push button extending outside the instrument. These and other novel features and advantages of the invention will be apparent from the following description of a preferred embodiment.

DESCRIPTION OF THE PREFERRED EMBODIMENTS

Figure 1:
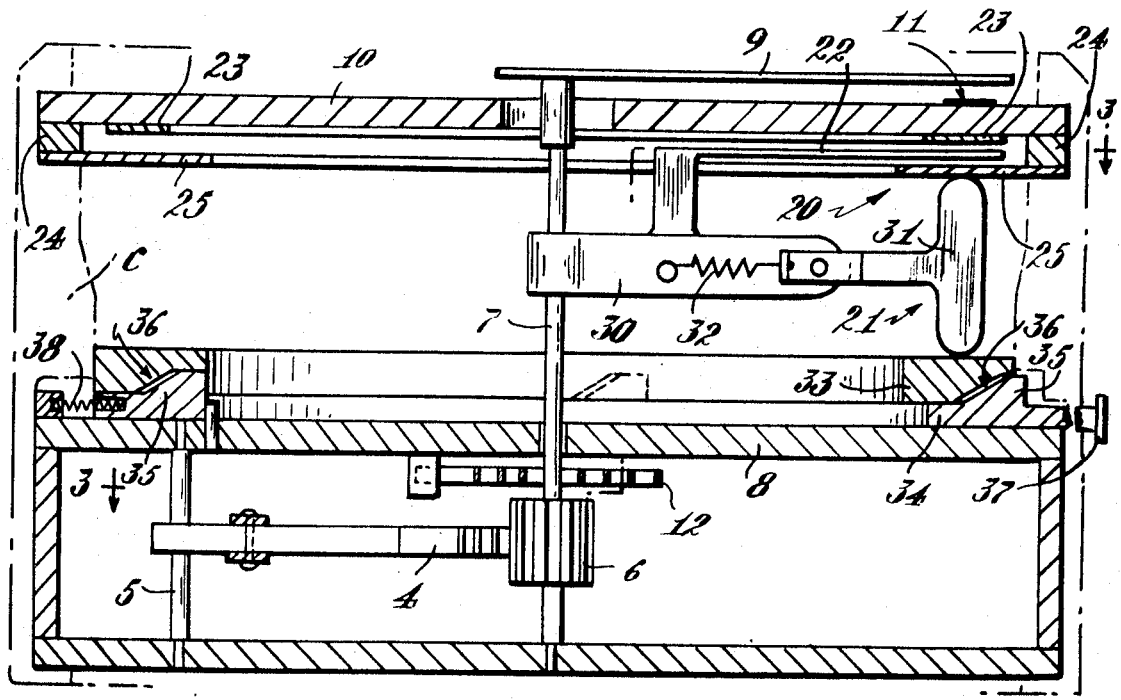
FIG. 1 is an essentially schematic axial section of a sphygmomanometer according to the invention.
Figure 3:
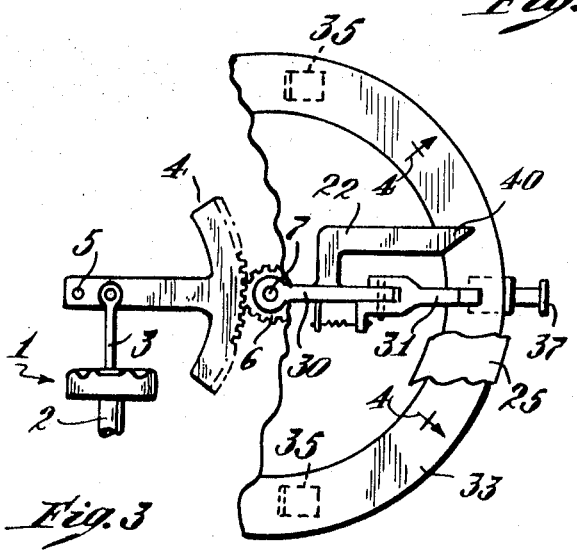
FIG. 3 is a section on line 3—3 of FIG. 1.

The sphygmomanometer illustrated in FIGS. 1–4 which makes use of the present invention is of the aneroid type and comprises, within a supporting cover C, a bellows 1 having an inlet 2 for connection to a hose leading to the space whose pressure is to be measured, in this case the cuff. When distended by pressure, bellows 1 moves a rod 3 connected to a sector gear 4 which is pivoted at 5 and which engages a pinion gear 6. The pinion gear 6 turns a shaft 7 journalled for rotation in a frame 8. The shaft 7 carries a pointer 9 over a dial 10 which is inscribed with an appropriate scale 11 to indicate units of pressure, e.g., mm of mercury. The pointer 9 is returned to zero on the scale by a hairspring 12 opposing the action of bellows 1. The sphygmomanometer described this far is conventional.

According to the invention, in the sphygmomanometer of FIGS. 1–4 the dial 10 is transparent or translucent and has a two-layer adhesion marking means 20 associated therewith, the shaft 7 carries a movable stylus 21 for impressing marks in the adhesion marking means 20 in registry with pointer 9, and the shaft 7 further carries erasure means 22 offset from stylus 21 on the lower pressure side for removing marks made in the previous use of the device.

The adhesion marking means 20 comprises an annular layer 23 of translucent tacky waxy material applied to the dial beneath the scale markings 11 and visible through transparent dial 10. Held closely adjacent to layer 23 by means of ring spacer 24 is an annular layer 25 of limp deformable pliable material which can be temporarily adhered to layer 23 by forcible contact and which is preferably of an intense color which will show up clearly therethrough when so adhered. As is well known to the adhesion marking art, the layer 23 changes its optical properties from translucency more toward transparency when the layer 25 is pressed against it by stylus 21. Preferred materials are, for layer 23, a plastic wax manufactured by the Bareco Division of the Petrolite Corporation of Tulsa, Oklahoma, under the trade name Victory White, and for layer 25, polyethylene film or rayon acetate fabric. Other suitable materials for the adherent layer 23 and deformable layer 25 are disclosed in the following prior art patents, incorporated herein by reference: U.S. Pat. Nos. 1,455,579; 1,480,920; 1,512,827; 1,631,192; 2,074,855; 2,333,597, 2,359,195; 2,663,095; 2,697,884; 2,879,609; 3,149,425; 3,149,426; 3,279,100; 3,280,493. As these patents disclose or suggest, a tough plastic protective layer may be placed between pliable layer 25 and stylus 21. Similarly, layer 23 may be applied to pliable layer 25 instead of dial 10, particularly if the underside of dial 10 is embossed to make it translucent. A marking means which can be substituted for the above marking means 20 is similar to that disclosed in U.S. Pat. No. 3,055,113, incorporated by reference, and has a deposit or layer of aluminum powder on dial 10 instead of layer 23. Marks are impressed in the powder layer by the stylus in a wiping or cleaning fashion, and are erased by redepositing the layer from excess powder sealed locally and spread by agitating the gauge.

Figure 2:
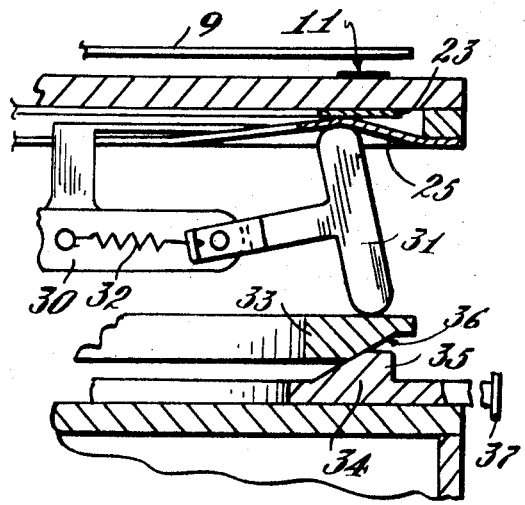
FIG. 2 is a view similar to FIG. 1 with portions removed, showing the stylus in marking position.
Figure 4:
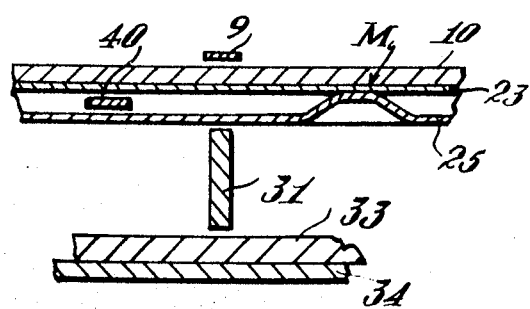
FIG. 4 is a circumferential section looking radially outward on line 4—4 of FIG. 3.

The movable stylus 21 which is used to mark the adhesion marking means 20 is illustrated in FIGS. 1 and 2 as comprising an extension arm 30 fixed at one end to the shaft 7 and at the other end pivotally mounting a T-shaped marker 31 held in a neutral position (FIG. 1) by tension spring 32. The T-shaped marker 31 is in registry with pointer 9 and is moved from its neutral position to impress a mark beneath the pointer (FIG. 2) by means of upper and lower camming rings 33 and 34, respectively. The upper camming ring 33 lies below the circular path of marker 31 and is constrained to move only vertically. The lower camming ring 34 has a number of camming protrusions 34 engaging corresponding ramps 36 on the upper camming ring, and it is adapted to be moved horizontally by means of an external push button 37 to cause the upper ring 33 to rise and thereby push marker 31 into contact with the marking means 20 (FIG. 2). A compression spring 38 opposes push button 37 and returns the lower ring 34 to inactive status after marking. Spring means (not shown) may also be provided to return upper ring 33 to its former position after marking.

The erasure means 22 which automatically removes marks M (FIG. 4) in marking means 20, does so by separating the adhered portions. The erasure means is mounted on arm 30 and therefore moves with shaft 7. It has a separator portion 40 which extends between marking layers 23 and 25 and which is offset on the low pressure side from pointer 9 and marker 31. Thus as readings are taken during deflation (movement of pointer to left in FIG. 4), the separator portion 40 rides in advance of marker 31 and out of the way of marks M which are to be made and recorded. However, when the system is again inflated for new readings, the separator 40 erases all prior marks M to provide a clean area for marking.

A preferred sphygmomanometer according to the invention is illustrated in FIGS. 5-8, which omit the conventional aneroid bellows, gears, hairspring and associated apparatus described above with reference to FIGS. 1-4. Such apparatus turns a shaft 107 journalled for rotation and carrying a pointer 109 over a dial 110 which is frosted except for a transparent ring T. Adjacent transparent ring T, the dial 110 is inscribed with an appropriate scale 111 to indicate units of pressure.

Beneath the transparent portion T of dial 110 is a two-layer adhesion marking means 120 comprising an annular layer 123 of translucent waxy material applied to the dial and an adjacent annular layer 125 of deformable material which can be temporarily adhered to the layer 123 by forcible contact and which will show up clearly therethrough when so adhered. Suitable materials and arrangements for marking means 120 and layers 123 and 125 are those disclosed previously for marking means 20 and layers 23 and 25.

A movable stylus 121, carried in registry with pointer 109 on shaft 107, is provided to impress marks in marking means 120. As illustrated, stylus 121 comprises a flexible arm 130 secured to shaft 107 and having at its outer end a yoke 130a which pivotally mounts a marking member 131. A leaf-spring 132 is fixedly secured at one end to marking member 131 and has its other end resting against flexible arm 130, being loosely secured there by means of an inturned catch 132a. Formed integrally with arm 130 and opposite thereto is a counterweight sheet 130b, which neutralizes bending moments on shaft 107 caused by the other portions of stylus 121. When moved upwardly from the neutral position shown, stylus marking member 131 makes a wiping contact with marking means 120 to impress a clear mark, the wiping contact taking place as spring 132 resiliently deforms during the contact to cause the marking member 131 to rotate against the bias of the spring.

Figure 6:
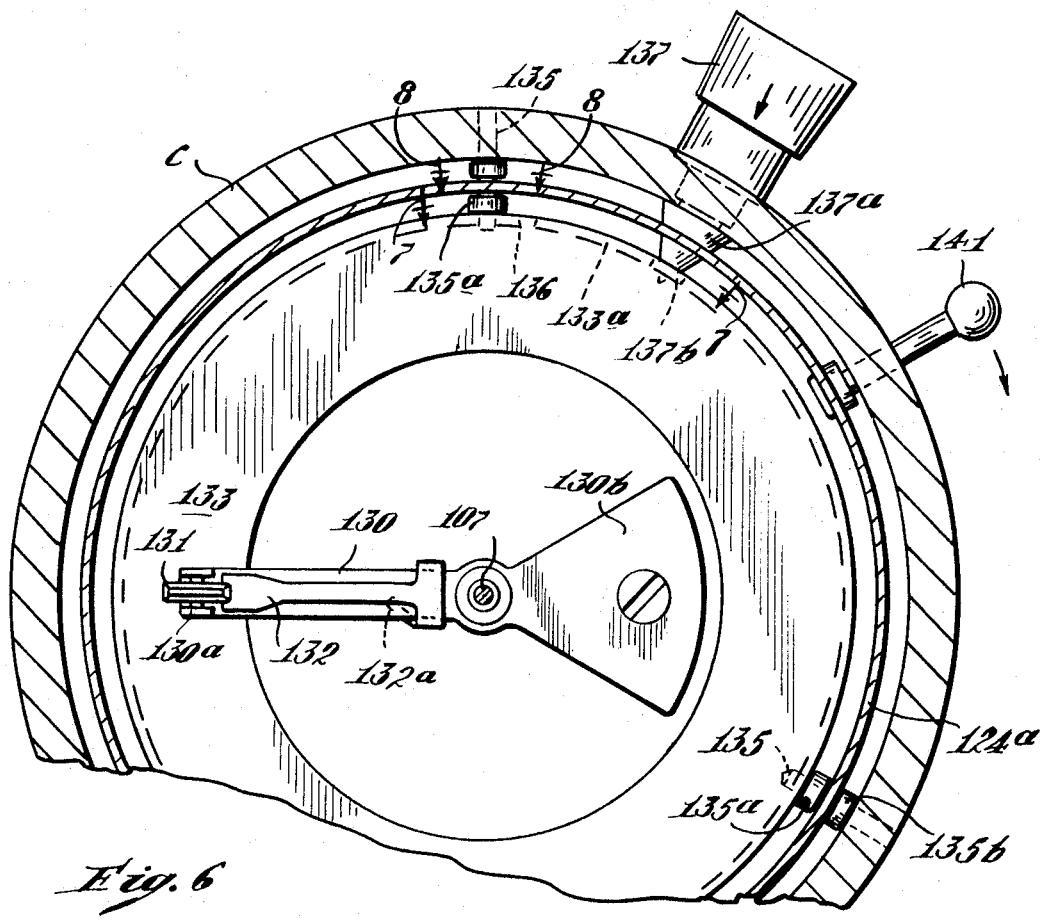
FIG. 6 is a partial section on line 6—6 of FIG. 5.
Figure 7:
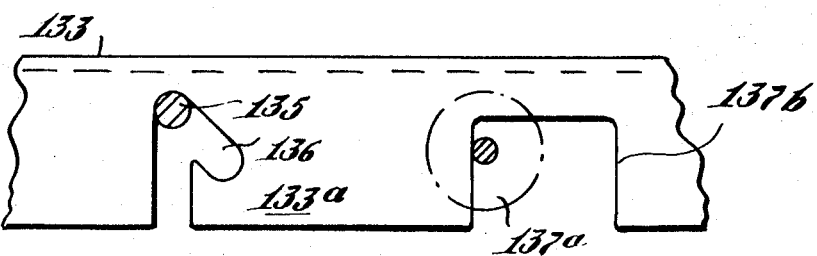
FIG. 7 is a circumferential section looking radially inward on line 7—7 of FIG. 6.
Figure 8:
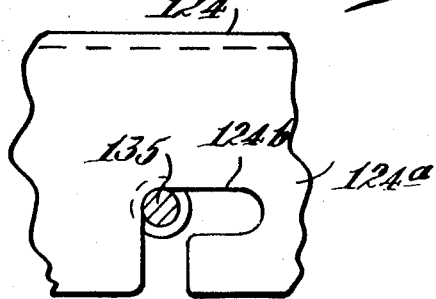
FIG. 8 is a circumferential section looking radially inward on line 8—8 of FIG. 6.

Stylus 121 is moved upwardly from the neutral position illustrated by a ring-shaped platform 133 which is moved in response to a push button 137 mounted on the sphygmomanometer casing C (FIG. 6). The platform 133 has a cylindrical flange 133a and is mounted for helical motion about pointer shaft 107 by means of three circumferential inclined cam slots 136 provided in flange 133a and three circumferentially spaced mounting studs 135 secured to casing C and fitting in slots 136. The push button 137 propels platform 133 in its helical path through the camming action provided by the conical portion 137a directed radially inwardly by push button 137 against the edge of a rectangular slot 137b provided in flange 133a (FIG. 7). Spring return means (not illustrated) are provided to bias push button 137 outwardly and to bias platform 133 in a non-marking position. To keep the platform 133 centered despite radial forces exerted by push button 137, the mounting studs 135 are provided with enlarged guide stops 135a.

Figure 5:
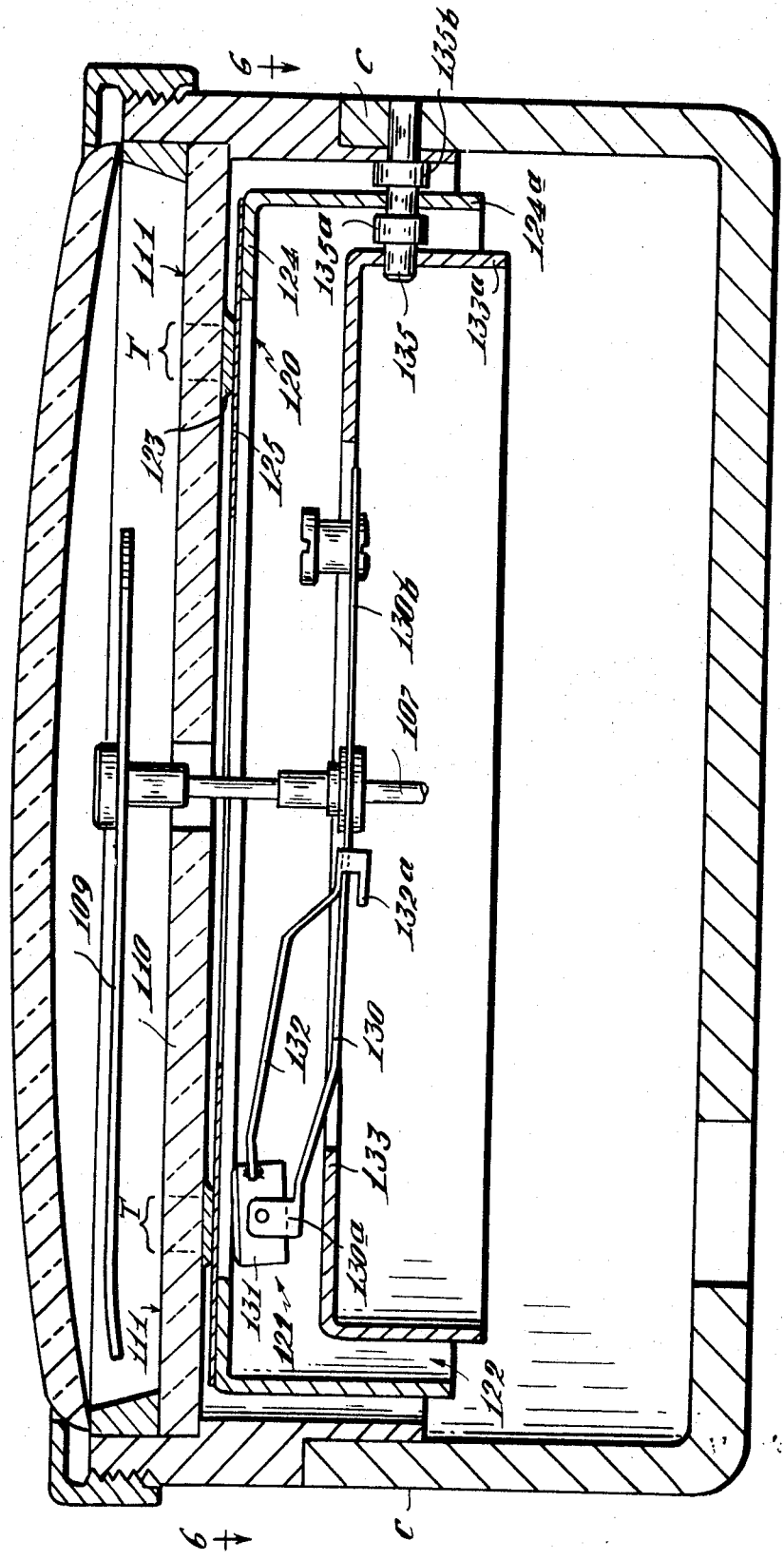
FIG. 5 is an axial section of another sphygmomanometer according to the invention, with conventional aneroid gauge apparatus removed for clarity.

Marks which have been impressed in marking means 120 are erased by an erasure means 122 which separates the adhered portions by rotating the layer 125 relatively to the layer 123. As shown in FIG. 5, the pliable layer 125 is attached to a mounting ring 124 which has a cylindrical flange 124a provided with horizontal slots 124b which receive mounting studs 135 (FIG. 8) within guide stops 135b. Secured to the flange 124a is an actuating post 141 which extends outside the gauge casing C and which is moved by the operator in a circumferential direction to rotate the mounting ring 124 and to thereby pull the deformable layer 125 apart from the waxy layer 123 of the marking means 120. Return spring means (not shown) are provided to restore the mounting ring 124 to its initial position. Erasure means 122, unlike erasure means 22 of FIGS. 1-4, is thus completely independent of operation of the indicating or recording functions of the sphygmomanometer and marks once made can be retained as long as desired. Such independent erasability permits the operator to make several blood pressure determinations, each being recorded by a mark, the several marks then being averaged to obtain a more reliable reading and then erased.

It should be understood that the present disclosure is for the purpose of illustration and that the invention includes all modifications falling within the scope of the appended claims.

I claim:

1. A recording sphygmamanometer comprising a gauge with a shaft and a pointer carried by said shaft over a dial, characterized by recording means including marking means adjacent said dial, a movable stylus for impressing marks in said marking means, and erasure means for removing said marks, said stylus being carried by said shaft in registry with said pointer, said marking means comprising two annular layers of material closely spaced from one another and adapted to be temporarily adhered by said stylus and said erasure means including a movable mount for one of said adherable layers of material, and means for moving said mount relatively to the other of said adherable layers to pull apart the portions of said layers temporarily adhered by said stylus.

2. A recording sphygmomanometer according to claim 1 wherein said layer mount comprises a ring mounted in said gauge for rotation in the plane of said layer, and wherein said moving means is attached to said ring and operable from the exterior of said gauge.

3. A recording sphygmomanometer comprising a gauge with a shaft and a pointer carried by said shaft over a dial, characterized by recording means including marking means adjacent said dial, and a movable stylus for impressing marks in said marking means, said stylus being carried by said shaft in registry with said pointer, and comprising
  a flexible arm secured to said shaft;
  a marking member pivotally mounted to said flexible arm; and
  spring means connecting said marking member to said flexible arm to bias said marking member against one direction of pivoting, said spring means resiliently deforming as said marking member impresses a mark, thereby to cause said marking member to pivot during marking.

4. A recording sphygmomanometer according to claim 3 wherein said spring means comprises a leaf spring fixedly secured to said marking member and bearing against said flexible arm.

5. A recording sphygmomanometer comprising a gauge with a shaft and a pointer carried by said shaft over a dial, characterized by recording means including marking means adjacent said dial, a movable stylus for impressing marks in said marking means, and means for moving said stylus, said stylus being carried by said shaft in registry with said pointer, said moving means being operable from the exterior of said gage and comprising a ring mounted for helical motion about the shaft carrying said stylus, said ring pushing said stylus axially to impress a mark during such motion, and pushbutton means operable from the exterior of said gauge for moving said ring.

* * * * *